(12) United States Patent
Longa et al.

(10) Patent No.: US 7,991,162 B2
(45) Date of Patent: Aug. 2, 2011

(54) ACCELERATING SCALAR MULTIPLICATION ON ELLIPTIC CURVE CRYPTOSYSTEMS OVER PRIME FIELDS

(75) Inventors: Patrick Longa, Kitchener (CA); Ali Miri, Ottawa (CA)

(73) Assignee: University of Ottawa, Ottawa, Ontario (CA)

(*) Notice: Subject to any disclaimer, the term of this patent is extended or adjusted under 35 U.S.C. 154(b) by 872 days.

(21) Appl. No.: 11/855,563

(22) Filed: Sep. 14, 2007

(65) Prior Publication Data

US 2009/0074178 A1    Mar. 19, 2009

(51) Int. Cl.
  H04L 9/08    (2006.01)
  H04L 9/00    (2006.01)
  H04L 9/30    (2006.01)
  H04K 1/00    (2006.01)
  G06F 7/00    (2006.01)
  G06F 15/00   (2006.01)
  H04L 9/28    (2006.01)
  G06F 7/38    (2006.01)

(52) U.S. Cl. ........... 380/282; 380/30; 380/280; 708/492

(58) Field of Classification Search .......... 708/490, 708/492; 380/280, 282
See application file for complete search history.

(56) References Cited

U.S. PATENT DOCUMENTS

| | | | |
|---|---|---|---|
| 5,854,759 A * | 12/1998 | Kaliski et al. | 708/492 |
| 6,038,581 A | 3/2000 | Aoki et al. | |
| 6,202,076 B1 | 3/2001 | Aoki et al. | |
| 6,252,959 B1 | 6/2001 | Paar et al. | |
| 6,266,688 B1 | 7/2001 | Aoki et al. | |
| 6,389,442 B1 | 5/2002 | Yin et al. | |
| 6,415,310 B1 | 7/2002 | Takenaka et al. | |
| 6,480,606 B1 * | 11/2002 | Kurumatani | 380/30 |
| 6,714,648 B2 | 3/2004 | Miyazaki et al. | |
| 6,721,771 B1 | 4/2004 | Chang | |
| 6,738,478 B1 | 5/2004 | Vanstone et al. | |
| 6,772,184 B2 * | 8/2004 | Chang | 708/491 |

(Continued)

FOREIGN PATENT DOCUMENTS

EP    1 296 224    3/2003

(Continued)

OTHER PUBLICATIONS

Liu, Shuang-Gen & Yu-Pu Hu, A Fast and Secure Elliptic Curve Scalar Multiplication Algorithm Over GF(pm), Journal of the Chinese Institute of Industrial Engineers, vol. 26, No. 4, pp. 255-265 (2009).*

(Continued)

Primary Examiner — Christopher A Revak
Assistant Examiner — Carolyn B Kosowski
(74) Attorney, Agent, or Firm — Garvey, Smith, Nehrbass & North, L.L.C.; Brett A. North (57) ABSTRACT

A method and apparatus for accelerating scalar multiplication in an elliptic curve cryptosystem (ECC) over prime fields is provided. Multiplication operations within an ECC point operation are identified and modified utilizing an equivalent point representation that inserts multiples of two. Algebraic substitutions of the multiplication operations with squaring operations and other cheaper field operations are performed. Scalar multiplication can also be protected against simple side-channel attacks balancing the number of multiplication operations and squaring operations and providing novel atomic structures to implement the ECC operation. In addition, a new coordinate system is defined to enable more effective operation of ECC to multiprocessor environments.

25 Claims, 5 Drawing Sheets

U.S. PATENT DOCUMENTS

| | | | |
|---|---|---|---|
| 6,804,782 B1 | 10/2004 | Qiu et al. | |
| 6,816,594 B1 | 11/2004 | Okeya | |
| 6,826,586 B2 | 11/2004 | Chang | |
| 6,873,706 B1 | 3/2005 | Miyazaki et al. | |
| 6,876,745 B1 | 4/2005 | Kurumatani | |
| 6,914,986 B2 | 7/2005 | Handschuh | |
| 6,968,354 B2* | 11/2005 | Kaminaga et al. | 708/491 |
| 7,020,281 B2 | 3/2006 | Vadekar et al. | |
| 7,043,015 B2 | 5/2006 | Lauter et al. | |
| 7,046,801 B2 | 5/2006 | Okeya | |
| 7,110,538 B2 | 9/2006 | Gallant et al. | |
| 7,123,717 B1 | 10/2006 | Coron et al. | |
| 7,162,033 B1 | 1/2007 | Coron | |
| 7,177,422 B2 | 2/2007 | Akishita | |
| 7,197,527 B2* | 3/2007 | Naslund et al. | 708/492 |
| 7,200,225 B1 | 4/2007 | Schroeppel | |
| 7,215,780 B2 | 5/2007 | Lambert et al. | |
| 7,233,663 B2 | 6/2007 | Sotoodeh | |
| 7,236,589 B2 | 6/2007 | Lauter et al. | |
| 7,240,084 B2 | 7/2007 | Gura et al. | |
| 7,447,310 B2* | 11/2008 | Koc et al. | 380/28 |
| 7,602,907 B2* | 10/2009 | Zhu et al. | 380/30 |
| 7,676,037 B2* | 3/2010 | Jung et al. | 380/28 |
| 7,856,101 B2* | 12/2010 | Al-Gahtani et al. | 380/30 |
| 2003/0142820 A1* | 7/2003 | Futa et al. | 380/30 |
| 2003/0206628 A1 | 11/2003 | Gura et al. | |
| 2004/0001590 A1 | 1/2004 | Eisentraeger et al. | |
| 2004/0158597 A1* | 8/2004 | Ye et al. | 708/492 |
| 2005/0036609 A1 | 2/2005 | Eisentraeger et al. | |
| 2006/0056619 A1* | 3/2006 | Billet et al. | 380/28 |
| 2007/0050442 A1* | 3/2007 | Takagi et al. | 708/492 |
| 2007/0198824 A1* | 8/2007 | Chen et al. | 713/150 |
| 2007/0271323 A1* | 11/2007 | Stein et al. | 708/492 |
| 2008/0219437 A1* | 9/2008 | Ebeid | 380/30 |
| 2008/0219438 A1* | 9/2008 | Ebeid | 380/30 |
| 2009/0041229 A1* | 2/2009 | Douguet et al. | 380/28 |
| 2009/0067617 A1* | 3/2009 | Trichina et al. | 380/28 |
| 2009/0214025 A1* | 8/2009 | Golic | 380/28 |
| 2009/0287756 A1* | 11/2009 | Lauter et al. | 708/492 |
| 2010/0183142 A1* | 7/2010 | Katagi et al. | 380/28 |

FOREIGN PATENT DOCUMENTS

| | | |
|---|---|---|
| EP | 1 443 393 | 8/2004 |
| WO | WO 00/59156 | 10/2000 |
| WO | WO 01/93014 | 12/2001 |
| WO | WO 02/01343 | 1/2002 |
| WO | WO 2006/092448 | 9/2006 |
| WO | WO 2007/025796 | 3/2007 |
| WO | WO 2007/045258 | 4/2007 |
| WO | WO 2007/048430 | 5/2007 |

OTHER PUBLICATIONS

K. Aoki, F. Hoshino, T. Kobayashi and H. Oguro, "Elliptic Curve Arithmetic Using SIMD," ISC2001, vol. 2200 of Lecture Notes in Computer Science, pp. 235-247, Springer-Verlag, 2.

R, Avanzi, V. Dimitrov, C. Doche and F. Sica, "Extending Scalar Multiplication Using Double Bases," Proc. AsiaCrypt'06, LNCS vol. 4284, pp. 130-144, 2006.

R. Avanzi, "Aspects of Hyperelliptic Curves over Large Prime Fields in Software Implementations," in Workshop on Cryptographic Hardware and Embedded Systems (CHES'04), vol. 31.

R. Avanzi and F. Sica, "Scalar Multiplication on Koblitz Curves using Double Bases," Technical Report No. 2006/067, Cryptology ePrint Archive, 2006.

R. Avanzi, "Side Channel Attacks on Implementations of Curve-Based Cryptographic Primitives," Cryptology ePrint Archive, Report 2005/017, 2005. Available at: http://eprint.iac.

D. Bernstein, "Curve25519: New Diffie-Hellman Speed Records," available at: http://cr.yp.to/talks.html.

D. Bernstein, "High-Speed Diffie-Hellman, Part 2," presentation in INDOCRYPT'06, tutorial session, 2006.

M. Brown, D. Hankerson, J. Lopez and A. Menezes, "Software Implementation of the NIST elliptic curves over prime fields," in Progress in Cryptology CT-RSA 2001 , vol. 2020 of Lecture Notes in Computer Science, pp. 250-265, Springer-Verlag, 2001.

O. Billet and M. Joye, "The Jacobi Model of an Elliptic Curve and Side-Channel Analysis," Cryptology ePrint Archive, Report 2002/125, 2002. Available at: http://eprint.iacr.org/2002/125/.

O. Brier and M. Joye, "Fast Point Multiplication on Elliptic Curves through Isogenies," Applied Algebra, Algebraic Algorithms and Error-Correcting Codes, LNCS vol. 2643, pp. 43-50, Springer-Verlag, 2003.

B. Chevallier-Mames, M. Ciet and M. Joye, "Low-Cost Solutions for Preventing Simple Side-Channel Analysis: Side-Channel Atomicity," IEEE Transactions on Computers, 53(6), pp. 760-768, 2004.

M. Ciet, M. Joye, K. Lauter and P. L. Montgomery, "Trading Inversions for Multiplications in Elliptic Curve Cryptography," in Designs, Codes and Cryptography. vol. 39, No. 2, pp. 189-206, 2006.

H. Cohen, A. Miyaji and T. Ono, "Efficient Elliptic Curve Exponentiation using Mixed Coordinates," Advances in Cryptology—ASIACRYPT '98, vol. 1514 of Lecture Notes in Computer Science, pp. 51-65, Springer-Verlag, 1998.

J.S. Coron, "Resistance against Differential Power Analysis for Elliptic Curve Cryptosystems," in Workshop on Cryptographic Hardware and Embedded Systems (CHES), Springer-Verlag, pp. 292-302, 1999.

V. S. Dimitrov, G. A. Jullien, and W. C. Miller, "An Algorithm for Modular Exponentiation," Information Processing Letters, 66(3):155-159, 1998.

V. Dimitrov, L. Imbert and P.K. Mishra, "Efficient and Secure Elliptic Curve Point Multiplication using Double-Base Chains," Advances in Cryptology—ASIACRYPT'05, vol. 3788 of Lecture Notes in Computer Science, pp. 59-78, Springer-Verlag, 2005.

M. Ciet, G. Piret and J. Quisquater, "Several Optimizations for Elliptic Curves Implementation on Smart Card," Technical Report, UCL Crypto Group, 2001.

C. Doche and L. Imbert, Extended Double-Base Number System with Applications to Elliptic Curve Cryptography, in Progress in Cryptology—INDOCRYPT 2006, LNCS 4329, pp. 335-348, 2006.

C. Doche, T. Icart and D. Kohel, "Efficient Scalar Multiplication by Isogeny Decompositions," in Proc. PKC 2006, LNCS 3958, 191-206, Springer-Verlag, 2006.

K. Eisentraeger, K. Lauter and P. Montgomery, "Fast Elliptic Curve Arithmetic and Improved Well Pairing Evaluation," in Topics in Cryptology—CT-RSA'2003, vol. 2612 of Lecture Notes in Computer Science, pp. 343-354, Springer-Verlag, 2003.

L. Elmegaard-Fessel, "Efficient Scalar Multiplication and Security against Power Analysis in Cryptosystems based on the NIST Elliptic Curves over Prime Fields," Master Thesis, University of Copenhagen, 2006.

W. Fischer, C. Giraud, E.W. Knudsen and J.-P. Seifert, "Parallel Scalar Multiplication on General Elliptic Curves over Fp Hedged against Non-Differential Side-Channel Attacks," in IACR ePrint archive, Report 2002/007, 2002. Available at: http://www.iacr.org.

J. Großschädl, R. Avanzi, E. Savas and S. Tillich, "Energy-Efficient Software Implementation of Long Integer Modular Arithmetic," in Workshop on Cryptographic Hardware and Embedded Systems (CHES'05), vol. 3659 of Lecture Notes in Computer Science, Springer-Verlag, pp. 75-90, 2005.

C.H. Gebotys and R.J. Gebotys, "Secure Elliptic Curve Implementations: An Analysis of Resistance to Power-Attacks in a DSP Processor," in Workshop on Cryptographic Hardware and Embedded Systems (CHES'03), vol. 2523 of Lecture Notes in Computer Science, Springer-Verlag, pp. 114-128, 2003.

D. Gordon, "A Survey of Fast Exponentiation Methods," Journal of Algorithms, vol. 27, pp. 129-146, 1998.

N. Gura, A. Patel, A. Wander, H. Eberle and S.C. Shantz, "Comparing Elliptic Curve Cryptography and RSA on 8-bit CPUs," in Workshop on Cryptographic Hardware and Embedded Systems (CHES'04), vol. 3156 of Lecture Notes in Computer Science, Springer-Verlag, pp. 119-132, 2004.

IEEE Std 1363-2000. IEEE Standard Specifications for Public-Key Cryptography. The Institute of Electrical and Electronics Engineers (IEEE), 2000.

T. Izu and T. Takagi, "Fast Elliptic Curve Multiplications with SIMD Operations," in 4th International Conference on Information and Communications Security (ICICS'02), vol. 2513 of Lecture Notes in Computer Science, pp. 217-230, Springer-Verlag, 2002.

T. Izu and T. Takagi, "A Fast Parallel Elliptic Curve Multiplication Resistant against Side Channel Attacks," in Public Key Cryptography (PKC '02), vol. 2274 of Lecture Notes in Computer Science, pp. 280-296, Springer-Verlag, 2002.

T. Izu and T. Takagi, "Fast Elliptic Curve Multiplications Resistant against Side Channel Attacks," in IEICE Trans. Fundamentals, vol. E88-A, No. 1, pp. 161-171, 2005.

M. Joye and S.-M. Yen, "New Minimal Modified Radix-r Representation with Applications to Smart Cards," PKC 2002, LNCS 2274, pp. 375-384, 2002.

C. Kocher, J. Jaffe and B. Jun, "Differential Power Analysis," Advances in Cryptology—CRYPTO '99, LNCS vol. 1666, pp. 388-397, 1999.

P.Y. Liardet and N.P. Smart, "Preventing SPA/DPA in ECC systems using the Jacobi form," in Workshop on Cryptographic Hardware and Embedded Systems (CHES 2001), vol. 2162 of Le.

C.H. Lim, and H.S. Hwang, "Fast implementation of Elliptic Curve Arithmetic in GF(pn)," in Proc. PKC'00, LNCS Vol. 1751, pp. 405-421, Springer-Verlag, 2000.

N. Meloni, "Fast and Secure Elliptic Curve Scalar Multiplication over Prime Fields using Special Addition Chains," Cryptology ePrint Archive, Report 2006/216, 2006.

P. K. Mishra, "Pipelined Computation of Scalar Multiplication in Elliptic Curve Cryptosystems," IEEE Transactions on Computers, vol. 25, No. 8, pp. 1000-1010, 2006.

FIPS Pub 186-2. Digital Signature Standard (DSS). National Institute of Standards and Technology (NIST), 2000.

N. P. Smart, "The Hessian Form of an Elliptic Curve," in Workshop on Cryptographic Hardware and Embedded Systems (CHES'01), vol. 2162 of Lecture Notes in Computer Science, pp. 118-125, Springer-Verlag, 2001.

J. Solinas, "Generalized Mersenne Numbers," Technical Report CORR-99-39, Dept. of C&O, University of Waterloo, 1999.

T. Takagi, S-M. Yen and B-C. Wu, " Radix-r Non-Adjacent Form," ISC 2004, LNCS vol. 3225, pp. 99-110, Springer-Verlag, 2004.

C.D. Walter, "Sliding Windows succumbs to Big Mac Attack," in Workshop on Cryptographic Hardware and Embedded Systems (CHES'01), vol. 2162 of Lecture Notes in Computer Science, pp. 286-299, Springer-Verlag, 2001.

A. Woodbury, "Efficient Algorithms for Elliptic Curve Cryptosystems on Embedded Systems," MSc. Thesis, Worcester Polytechnic Institute, 2001.

C.D. Walter and S. Thompson, "Distinguishing Exponent Digits by Observing Modular Subtractions," in Topics in Cryptology—CT-RSA 2001, vol. 2020 of Lecture Notes in Computer Science, pp. 192-207, Springer-Verlag, 2001.

Software multiplication using Gaussian normal bases Dahab, R.; Hankerson, D.; Hu, F.; Long, M.; Lopez, J.; Menezes, A., Transactions on Computers, vol. 55, Iss.8, Aug. 2006, pp. 974-984.

Double Point Compression with Applications to Speeding Up Random Point Multiplication Khabbazian, M.; Gulliver, T.A.; Bhargava, V.K., Transactions on Computers, vol. 56, Iss.3, Mar. 2007, pp. 305-313.

Analysis of fractional window recoding methods and their application to elliptic curve cryptosystems Schmidt-Samoa, K.; Semay, O.; Takagi, T., Transactions on Computers, vol. 55, Iss.1, Jan. 2006, pp. 48-57.

A new dual-field elliptic curve cryptography processor Yongyi Wu; Xiaoyang Zeng, Circuits and Systems, 2006. ISCAS 2006. Proceedings. 2006 IEEE International Symposium on, Vol., Iss., May 21-24, 2006, pp. 305-308.

A High-Performance Elliptic Curve Cryptographic Processor for General Curves Over GF(p) Based on a Systolic Arithmetic Unit Chen, G.; Bai, G.; Chen, H., Circuits and Systems II: Express Briefs, IEEE Transactions on [see also Circuits and Systems II: Analog and Digital Signal Processing, IEEE, Transactions on], vol. 54, Iss.5, May 2007, pp. 412-416.

Revisiting scalable modular multiplication over GF(2/sup m/) for elliptic curve cryptography Jin, Y.; Shen, H., Solid-State and Integrated Circuit Technology, 2006. ICSICT '06. 8th International Conference on, Vol., Iss., 2006, pp. 2114-2117.

Efficient Finite Field Processor for GF(2163) and its VLSI Implementation Ansari, Bijan; Wu, Huapeng, Information Technology, 2007. ITNG '07. Fourth International Conference on, Vol., Iss., Apr. 2-4, 2007, pp. 1021-1026.

Left-to-right Generalized Non-adjacent Form Recoding for Elliptic Curve Cryptosystems Fanyu Kong; Jia Yu; Zhun Cai; Daxing Li, Hybrid Information Technology, 2006. ICHIT '06. vol. 1. International Conference on, vol. 1, Iss., Nov. 2006, pp. 299-303.

Faster elliptic curve point multiplication based on a novel greedy base-2,3 method Cohen, A.E.; Parhi, K.K., Circuits and Systems, 2006. ISCAS 2006. Proceedings. 2006 IEEE International Symposium on, Vol., Iss., May 21-24, 2006, pp. 3374-3377.

Arithmetic Operations in Finite Fields of Medium Prime Characteristic Using the Lagrange Representation Bajard, J.-C.; Imbert, L.; Negre, C., Transactions on Computers, vol. 55, Iss.9, Sep. 2006.

Hardware Elliptic Curve Cryptographic Processor Over GF(p) Mcivor, C.J.; Mcloone, M.; Mccanny, J.V., Circuits and Systems I: Regular Papers, IEEE Transactions on [Circuits and Systems I: Fundamental Theory and Applications, IEEE Transactions on], vol. 53, Iss.9, Sep. 2006, pp. 1946-1957.

Improved Elliptic Curve Scalar Multiplication Algorithm Karthikeyan, E.; Balasubramaniam, P., Information and Automation, 2006. ICIA 2006. International Conference on, Vol., Iss., Dec. 15-17, 2006, pp. 254-257.

Efficient Hardware Implementations for the Gaussian Normal Basis Multiplication Over GF(2163) Trujillo-Olaya, Vladimir; Velasco-Medina, Jaime; Lopez-Hernandez, Julio C. Programmable Logic, 2007. SPL '07. 2007 3rd Southern Conference on, Vol., Iss., Feb. 26-28, 2007, pp. 45-50.

Accelerating Elliptic Curve Cryptography on System-on-Programmable-Chip Zhou, Jian-Yang; Jiang, Xiao-Gang, Anti-counterfeiting, Security, Identification, 2007 IEEE International Workshop on, Vol., Iss., Apr. 16-18, 2007, pp. 292-295.

Efficient algorithms and architectures for field multiplication using Gaussian normal bases Reyhani-Masoleh, A., Transactions on Computers, vol. 55, Iss. 1, Jan. 2006, pp. 34-47.

Design of flexible GF(2/sup m/) elliptic curve cryptography processors Benaissa, M.; Wei Ming Lim, Very Large Scale Integration (VLSI) Systems, IEEE Transactions on, vol. 14, Iss.6, Jun. 2006, pp. 659-662.

A novel memory architecture for elliptic curve cryptography with parallel modular multipliers Ralf Laue; Sorin A. Huss, Field Programmable Technology, 2006. FPT 2006. IEEE International Conference on, Vol., Iss., Dec. 2006, pp. 149-156.

Limiting Flexibility in Multiplication over GF(2m): A Design Methodology Chelton, W.; Benaissa, M., Signal Processing Systems Design and Implementation, 2006. SIPS '06. IEEE Workshop on, Vol., Iss., Oct. 2006, pp. 153-156.

High-Speed Pipelined EGG Processor on FPGA Chelton, W.; Benaissa, M., Signal Processing Systems Design and Implementation, 2006. SIPS '06. IEEE Workshop on, Vol., Iss., Oct. 2006, pp. 136-141.

GF(2m) Arithmetic Modules for Elliptic Curve Cryptography Miguel Morales-Sandoval; Claudia Feregrino-Uribe, Reconfigurable Computing and FPGA's, 2006. ReConFig 2006. IEEE International Conference on, Vol., Iss., Sep. 2006, pp. 1-8.

A Unified, Reconfigurable Architecture for Montgomery Multiplication in Finite Fields GF(p) and GF(2n) Sudhakar, M.; Kamala, R.V.; Srinivas, M.B., VLSI Design, 2007. Held jointly with 6th International Conference on Embedded Systems., 20th International Conference on, Vol., Iss., Jan. 2007, pp. 750-755.

Efficient Multiplier over Finite Field Represented in Type II Optimal Normal Basis Youbo Wang; Zhiguang Tian; Xinyan Bi; Zhendong Niu, Intelligent Systems Design and Applications, 2006. ISDA '06. Sixth International Conference on, vol. 1, Iss., Oct. 2006, pp. 1132-1128.

An optimal normal basis elliptic curve cryptoprocessor for inductive RFID application Pak-Keung Leung; Chiu-Sing Choy; Cheong-Fat Chan; Kong-Pang Pun, Circuits and Systems, 2006. ISCAS 2006. Proceedings. 2006 IEEE International Symposium on, Vol., Iss., May 21-24, 2006, pp. 4 pp.

Efficient Circuitry for Computing T-adic Non-Adjacent Form Jarvinen, Forsten, Skytta, Helsinki University of Technology, IEEE, 2006, pp. 232-235.

HW/SW Co-design for Accelerating Public-Key Cryptosystems over GF(p) on the 8051 Âi̇-controller Sakiyama, Kazuo; Batina, Lejla; Preneel, Bart; Verbauwhede, Ingrid, World Automation Congress, 2006. WAC '06, Vol., Iss., Jul. 24-26, 2006, pp. 1-6.

FPGA accelerated tate pairing based cryptosystems over binary fields Chang Shu; Soonhak Kwon; Kris Gaj, Field Programmable Technology, 2006. FPT 2006. IEEE International Conference on, Vol., Iss., Dec. 2006, pp. 173-180.

A New Side Channel Resistant Scalar Point Multiplication Method for Binary Elliptic Curves Cohen, Aaron E.; Parhi, Keshab K., Signals, Systems and Computers, 2006. ACSSC '06. Fortieth Asilomar Conference on, Vol., Iss., Oct.-Nov. 2006, pp. 1205-1209.

Strengthening ECDSA Verification Algorithm to be More Suitable to Mobile Networks K, Komathy; P, Narayanasamy, Computing in the Global Information Technology, 2006. ICCGI '06. International Multi-Conference on, Vol., Iss., Aug. 2006, pp. 61-61.

Design of a Reconfigurable Processor for NIST Prime Field ECC Kendall Ananyi; Daler Rakhmatov, Field-Programmable Custom Computing Machines, 2006. FCCM '06. 14th Annual IEEE Symposium on, Vol., Iss., Apr. 2006, pp. 333-334.

High-Throughput Montgomery Modular Multiplication Kamala, R.V.; Srinivas, M.B., Very Large Scale Integration, 2006 IFIP International Conference on, Vol., Iss., Oct. 2006, pp. 58-62.

A Microcoded Elliptic Curve Processor for GF(2m) Using FPGA Technology Qiong Pu; Jianhua Huang, Communications, Circuits and Systems Proceedings, 2006 International Conference on, vol. 4, Iss., Jun. 2006, pp. 2771-2775.

Low-Cost Elliptic Curve Digital Signature Coprocessor for Smart Cards Meurice de Dormale, G.; Ambroise, R.; Bol, D.; Quisquater, J.-J.; Legat, J.-D., Application-specific Systems, Architectures and Processors, 2006. ASAP '06. International Conference on, Vol., Iss., Sep. 2006, pp. 190-193.

A fast dual-field modular arithmetic logic unit and its hardware implementation Sakiyama, K.; Preneel, B.; Verbauwhede, I., Circuits and Systems, 2006. ISCAS 2006. Proceedings. 2006 IEEE International Symposium on, Vol., Iss., May 21-24, 2006, pp. 4 pp.

Unbalanced Exponent Modular Reduction over Binary Field and Its Implementation Haibin Shen; Yier Jin; Rongquan You, Innovative Computing, Information and Control, 2006. ICICIC '06. First International Conference on, vol. 1, Iss., Aug. 1-30, 2006, pp. 190-193.

Algorithm and implementation of signed-binary recoding with asymmetric digit sets for elliptic curve cryptosystems Ruan, X.; Katti, R.; Hinkemeyer, D., Circuits and Systems, 2006. ISCAS 2006. Proceedings. 2006 IEEE International Symposium on, Vol., Iss., May 21-24, 2006, pp. 4 pp.

Elliptic curves cryptosystem implementation based on a look-up table sharing scheme Sining Liu; Bowen, F.; King, B.; Wei Wang, Circuits and Systems, 2006. ISCAS 2006. Proceedings. 2006 IEEE International Symposium on, Vol., Iss., May 21-24, 2006, pp. 4 pp.

Comb Architectures for Finite Field Multiplication in F(2m) Namin, Ashkan Hosseinzadeh; Wu, Huapeng; Ahmadi, Majid, Transactions on Computers, vol. 56, Iss.7, Jul. 2007, pp. 909-916.

Fast Bit Parallel-Shifted Polynomial Basis Multipliers in $Gf(2\{n\})$ Fan, H.; Hasan, M. A., Circuits and Systems I: Regular Papers, IEEE Transactions on [Circuits and Systems I: Fundamental Theory and Applications, IEEE Transactions on], vol. 53, Iss.12, Dec. 2006, pp. 2606-2615.

Improved base-/spl phi/ expansion method for Koblitz curves over optimal extension fields Chung, B.; Kim, H.; Yoon, H., Information Security, IET, vol. 1, Iss.1, Mar. 2007 pp. 19-26.

A new approach to elliptic curve cryptography: an RNS architecture Schinianakis, D.M.; Kakarountas, A.P.; Stouraitis, T., Electrotechnical Conference, 2006. MELECON 2006. IEEE Mediterranean, Vol., Iss., May 16-19, 2006, pp. 1241-1245.

An RNS architecture of an F/sub p/ elliptic curve point multiplier Schinianakis, D.M.; Fournaris, A.P.; Kakarountas, A.P.; Stouraitis, T., Circuits and Systems, 2006. ISCAS 2006. Proceedings. 2006 IEEE International Symposium on, Vol., Iss., May 21-24, 2006, pp. 5 pp.

A Parallel Processing Hardware Architecture for Elliptic Curve Cryptosystems K. Sakiyama; E. De Mulder; B. Preneel; I. Verbauwhede, Acoustics, Speech and Signal Processing, 2006. ICASSP 2006 Proceedings. 2006 IEEE International Conference on, vol. 3, Iss., 2006, pp. III-III.

SPA resistant Elliptic Curve Cryptosystem using Addition Chains Byrne, A.; Meloni, N.; Crowe, F.; Marnane, W.P.; Tisserand, A.; Popovici, E.M. Information Technology, 2007. ITNG '07. Fourth International Conference on, Vol., Iss., Apr. 2-4, 2007, pp. 995-1000.

Power Analysis Attacks on ECC Randomized Automata Zhang, Fan; Connecticut, University of Information Technology, 2007. ITNG '07. Fourth International Conference on, Vol., Iss., Apr. 2-4, 2007, pp. 900-901.

New Countermeasures against Power Analysis Attacks for Koblitz Curve Crystosystems Yong-hee Jang; Naofumi Takagi; Kazuyoshi Takagi; Yong-jin Kwon, Computational Intelligence and Security, 2006 International Conference on, vol. 2, Iss., Nov. 3-6, 2006, pp. 1303-1306.

A Parallelization of ECDSA Resistant to Simple Power Analysis Attacks Aravamuthan, Sarang; Thumparthy, Viswanatha Rao, Communication Systems Software and Middleware, 2007. COMSWARE 2007. 2nd International Conference on, Vol., Iss., Jan. 7-12, 2007, pp. 1-7.

Quadrinomial Moduler Arithmetic using Modified Polynomial Basis, Negre, Christophe, LIRMM—University Montpellier, Proceedings of the International Conference on Informatiaon Technology: Coding and Computing (ITCC'05).

* cited by examiner

ACCELERATING SCALAR MULTIPLICATION ON ELLIPTIC CURVE CRYPTOSYSTEMS OVER PRIME FIELDS

TECHNICAL FIELD

The present invention relates to security technology, specifically, it relates to the computation of point operations in elliptic curve scalar multiplication.

BACKGROUND

Elliptic curve cryptosystems (ECC) are public-key cryptosystems that have attracted increasing attention in recent years due to their shorter key length requirement in comparison with other public-key cryptosystems such as RSA.

Public-key cryptosystems make use of a pair of keys, called public and private keys, to perform cryptographic operations such as encryption/decryption of data and signing/verification of digital signatures. In particular for ECC, private keys are scalar values that are kept in secret, and public keys are points on the elliptic curve that are made public. Given a secret scalar d and points P and dP on a elliptic curve, where dP is a multiple of the point P, the elliptic curve discrete logarithm problem (ECDLP) is defined as the problem of determining d, with P and dP known.

ECC can be defined over different finite fields. Most important finite fields used to date to implement this cryptosystem have been binary, prime and extension fields. Prime fields are denoted by $F_p$, where p is a large prime and also represents the number of elements of the field.

For the case of prime fields, the generic equation to represent an elliptic curve is given by:

$$E: y^2 = x^3 + ax + b$$

Where: $a, b \in F_p$ and $\Delta = 4a^3 + 27b^2 \neq 0$

Other variants of elliptic curve forms that also use prime fields can be found in the literature. Some examples are: Hessian and Jacobi forms, elliptic curves of degree ⅔ isogenies, among others.

The central and most time-consuming operation in ECC is scalar multiplication, generically represented by dP. Computing this operation involves performing addition of points, and doubling, tripling or quintupling (or similar) of a point. These operations are referred to as ECC point operations and their efficient execution is fundamental to the acceleration of the computation of scalar multiplication.

Side-channel information, such as power dissipation and electromagnetic emission, leaked by real-world devices has been shown to be highly useful for revealing private keys and effectively breaking the otherwise mathematically-strong ECC cryptosystem.

There are two main strategies to these attacks: simple (SSCA) and differential (DSCA) side-channel attacks. SSCA is based on the analysis of a single execution trace of a scalar multiplication to guess the secret key by revealing the sequence of operations used in the execution of ECC point arithmetic.

Extensive research has been carried out to yield effective countermeasures to deal with SSCA. Among them, side-channel atomicity dissolves point operations into small homogenous blocks, known as atomic blocks, which cannot be distinguished from one another through simple side-channel analysis because each one contains the same pattern of basic field operations. Furthermore, atomic blocks are made sufficiently small to make this approach inexpensive. For example the structure M-A-N-A (field multiplication, addition, negation, addition) has been proposed to build SSCA-protected point operations over prime fields.

However, the main drawback of the traditional M-A-N-A structure is that it relies on the assumption that field multiplication and squaring are indistinguishable from each other. In software implementations, timing and power consumption have been shown to be quite different for these operations, making them directly distinguishable through power analysis. Hardware platforms can be thought to be invulnerable to this attack when one hardware multiplier executes both field squarings and multiplications. However, some studies suggest that higher-order DSCA attacks can reveal differences between those operations by detecting data dependent information through observation of multiple sample times in the power trace.

In recent years a new paradigm has arisen in the design concept with the appearance of multiprocessor/parallel architectures, which can execute several operations simultaneously. This topic is becoming increasingly important since single processor design is reaching its limit in terms of clock frequency.

Similarly to other systems, ECC can be adapted to parallel architectures at different algorithmic levels. In particular, efforts to parallelize ECC formulae at the point arithmetic level have been shown to significantly reduce the time-complexity of scalar multiplication. However, the high number of expensive multiplications appearing in current point formulae limits the acceleration possible by taking advantage of multiple processing units in parallel implementations. In fact, given the fixed number of field squarings and multiplications in a given ECC point operation, the number of processing units that can be used effectively is limited to a maximum of 3.

Therefore there is a need for improving ECC point arithmetic to further accelerate and effectively protect scalar multiplication on elliptic curve cryptosystems over prime fields.

SUMMARY

The disclosure provides a method for accelerating scalar multiplication by replacing expensive field multiplications by squarings and other cheaper operations such as field addition and subtraction in ECC point operations over a prime field.

In accordance with one aspect there is provided a method of accelerating scalar multiplication in an elliptic curve cryptosystem (ECC) over prime fields, the method comprising the steps of: a) identifying multiplication operations within an ECC point operation; b) determining if multiplication operations in the ECC point operation are even or odd multiplications; c) modifying the ECC point operation if the chosen multiplication operations are odd, with an equivalent point representation utilizing multiples of two; and d) performing algebraic substitutions of the multiplication operations with squaring operations and other cheaper field operations such as addition, subtraction and multiplication or division by a small constant.

In accordance with another aspect there is provided an apparatus for performing scalar multiplications on an elliptic curve cryptosystem, the apparatus comprising: a memory; a processor for performing the steps of: a) identifying multiplication operations within an ECC point operation; b) determining if multiplication operations in the ECC point operation are even or odd multiplications; c) modifying the ECC point operation if the chosen multiplication operations are odd, with an equivalent point representation utilizing multiples of two; and d) performing algebraic substitutions of the multiplication operations with squaring operations and other cheaper field operations such as addition, subtraction and multiplication or division by a small constant.

In accordance with yet another aspect there is provided a computer readable medium containing instructions for accelerating scalar multiplication in an elliptic curve cryptosystem (ECC) over prime fields, the instructions which when executed by a processor perform the steps of: a) identifying multiplication operations within an ECC point operation; b) determining if multiplication operations in the ECC point operation are even or odd multiplications; c) modifying the ECC point operation if the chosen multiplication operations are odd, with an equivalent point representation utilizing multiples of two; and d) performing algebraic substitutions of the multiplication operations with squaring operations and other cheaper field operations such as addition, subtraction and multiplication or division by a small constant.

A further aspect provides for protecting scalar multiplication against simple side-channel attacks that can exploit distinctions between field multiplications and squarings to reveal the private key by balancing the number or multiplication operations and squaring operations and providing novel atomic structures to implement ECC point operations.

A further aspect provides for implementing scalar multiplication in parallel/multiprocessor devices that is fast and effectively utilizes multiple processing units by defining a new coordinate system for implementing ECC point operations.

Other aspects and features will become apparent to those ordinarily skilled in the art upon review of the following description of specific embodiment of the invention in conjunction with the accompanying figures.

BRIEF DESCRIPTION OF THE DRAWINGS

Further features and advantages will become apparent from the following detailed description, taken in combination with the appended drawings, in which.

It should be noted that throughout the appended drawings, like features are identified by like reference numerals.

DETAILED DESCRIPTION

Embodiments are described below, by way of example only, with reference to FIGS. 1-5. A system and method are provided for accelerating ECC point operations over prime fields by flexibly replacing multiplications by squarings and other cheaper field operations according to a given implementation.

Different environments and/or applications establish constraints and provide execution advantages according to their particular characteristics. Examples of different settings are implementations requiring side-channel attack-resistance and sequential or parallel/multiprocessor-based implementations. In terms of ECC over prime fields, the performance in those different settings is strongly determined by the required number of field operations such as multiplication, squaring and addition/subtraction to perform ECC point operations.

Traditional ECC point operations present a fixed set of field operations that is not optimal for most applications. For instance, point addition on generic curves over prime fields require 8 field multiplications and 3 field squarings. To implement this operation using side-channel atomicity and the traditional M-A-N-A structure would require 11 atomic blocks (8+3) with the additional disadvantage of considering field multiplication and squaring equivalent from a side-channel attack-resistance point of view. As it can be seen, this is not only suboptimal in terms of time execution but also unsecured against potential simple side-channel attacks that are able to distinguish multiplication from squaring.

In the following, a method is described that flexibly replaces field multiplications with squarings according to a given application with the objective of reducing the time execution.

Figure 1:
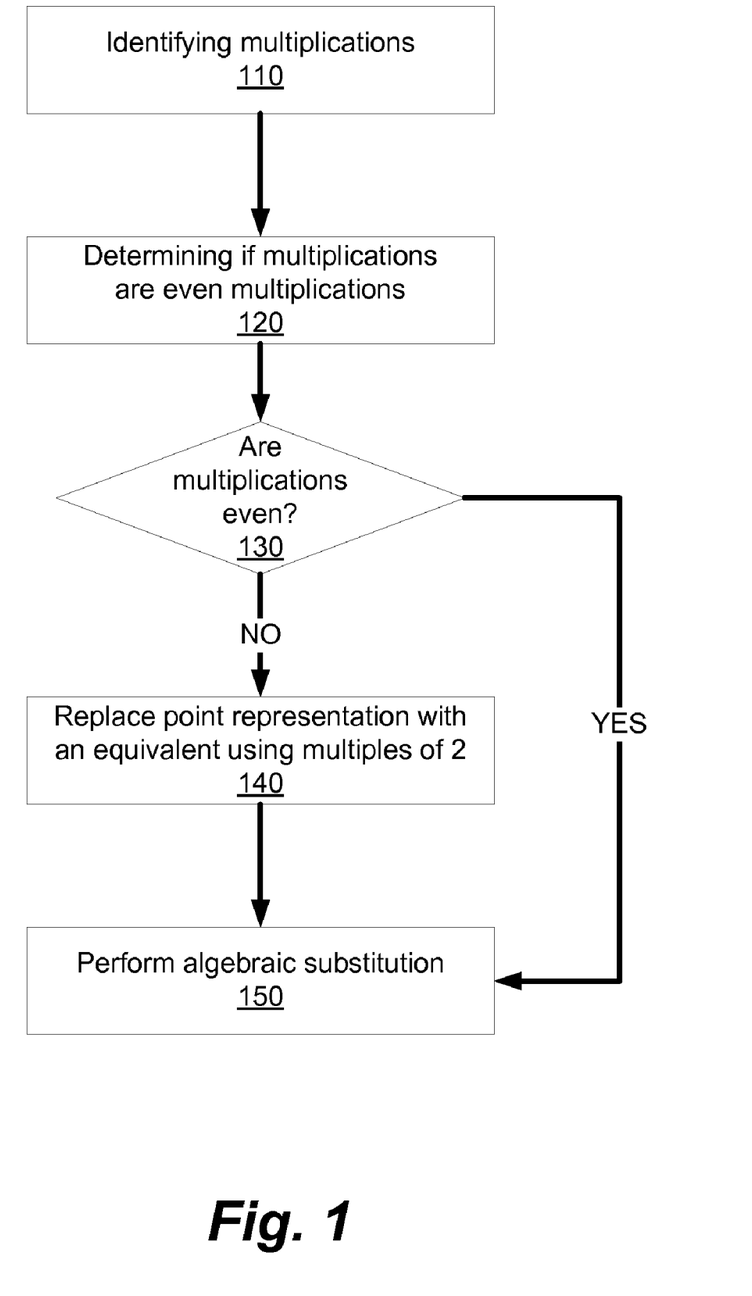
FIG. 1 is a flow diagram showing the method of replacing multiplication by squarings and other cheaper field operations.

As per FIG. 1, block 110, the method involves to first identifying field multiplications a·b that can be replaced by 1, 2 or 3 squarings as given by:

$$ab = \frac{1}{2}[(a+b)^2 - a^2 - b^2], \text{ or} \quad (1)$$

$$ab = \frac{1}{4}[(a+b)^2 - (a-b)^2] \quad (2)$$

Determining which multiplications fall in this category if we use (1) depends on the targeted application and if values $a^2$, $b^2$ or both pre-exist in the ECC point operation. For instance, in sequential implementations replacing one multiplication by one squaring is of benefit since the former is generally more time consuming than the latter. However, if 2 or 3 squarings replace one multiplication, then the execution becomes slower. Hence, in this setting both $a^2$ and $b^2$ should pre-exist in the ECC point operation to make practical the aforementioned substitution and essentially trade a·b for $(a+b)^2$.

Figure 2:
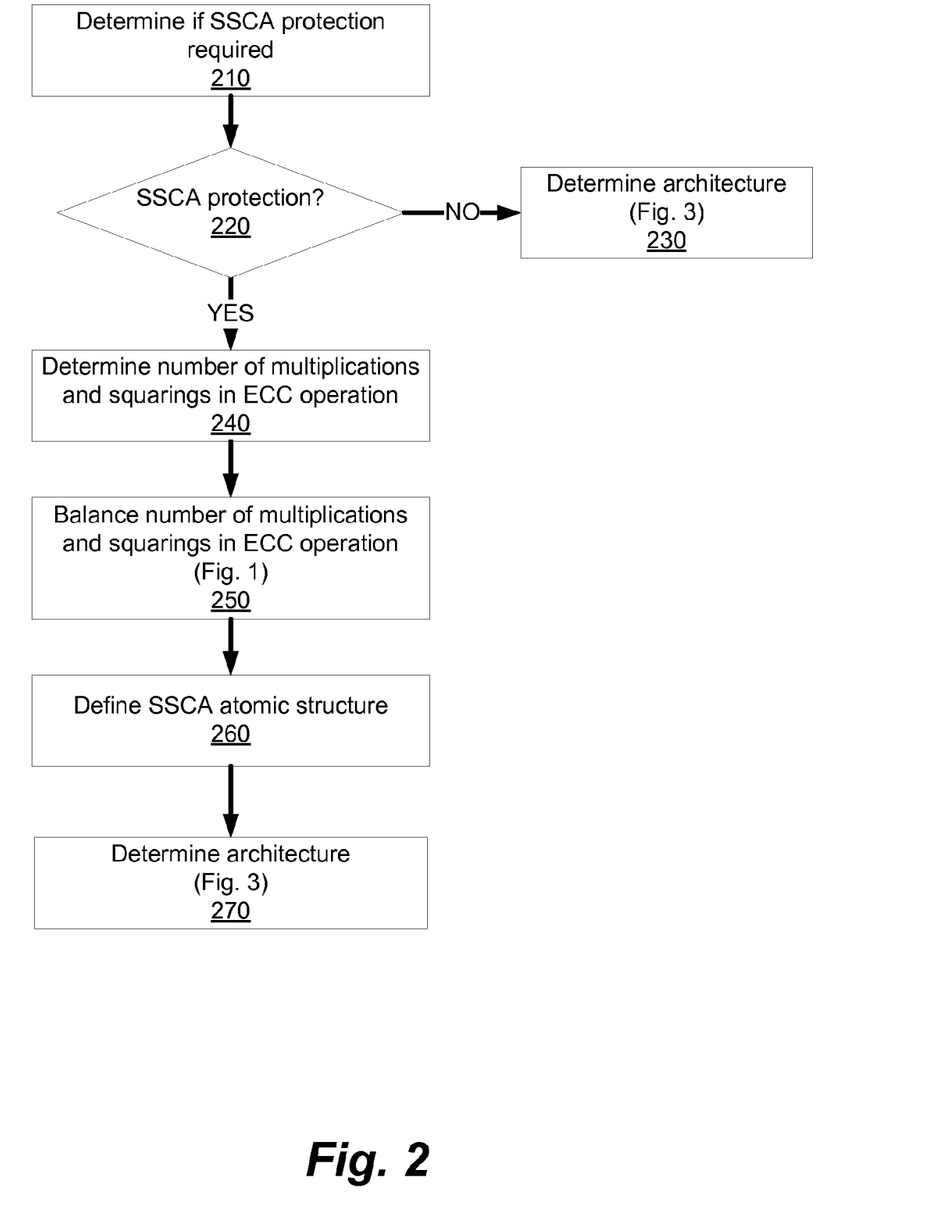
FIG. 2 is a flow diagram showing the method of protecting against simple side-channel attacks.

In the case of (2), operations $(a+b)^2$ and $(a-b)^2$ do not usually pre-exist in ECC point operations and thus, the trade is between one multiplication and two squarings. Note that this exchange could be advantageous if multiple processing units are available (FIG. 3) or if we need to balance the number of multiplications and squarings in SSCA-protected implementations (FIG. 2).

Referring to FIG. 1, at step 120, it is determined if some of the multiplications to be traded are not even (i.e., do not contain a multiple of 2 in their execution). If at least one of the multiplications is not even at decision block 130, the current point representation is replaced by an equivalent one that inserts the necessary multiple of 2 into the odd multiplication(s) step 140. The equivalent point is taken from the equivalence class for projective coordinates given by:

$(X:Y:Z) = \{(\lambda^c, X, \lambda^d, Y, \lambda Z): \lambda \in K^*, c, d \in Z^+\}$, where $\lambda = 2t$, $t \in Z^+$, to insert multiples of 2.

Once multiplications to be traded are even, at step 150 they are replaced by applying the following algebraic substitutions, which hold for prime fields:

$2ab = (a+b)^2 - a^2 - b^2$ \quad (3), or $4ab = (a+b)^2 - (a-b)^2$ \quad (4)

Figure 3:
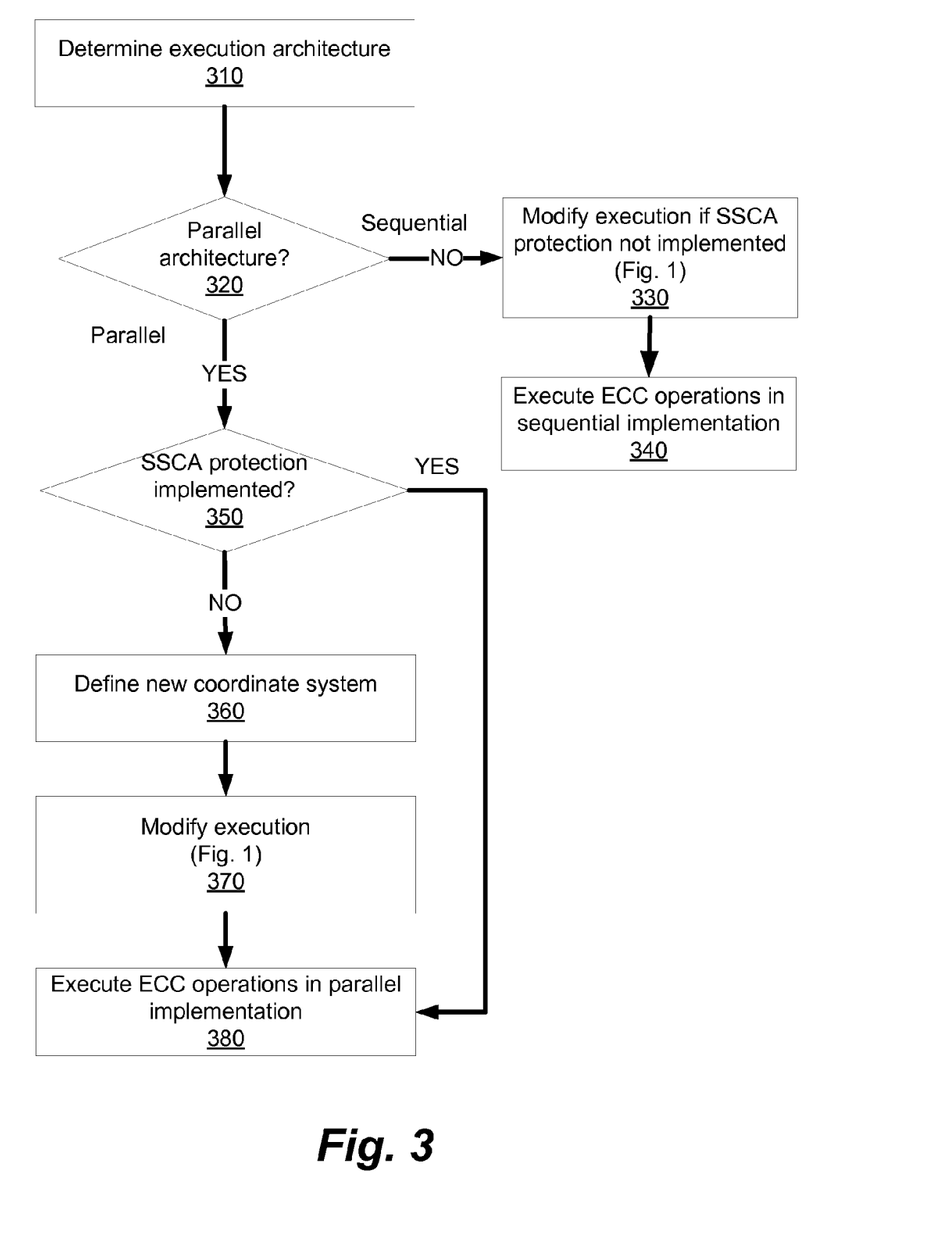
FIG. 3 is a flow diagram showing the method of implementing ECC point operations in parallel/multiprocessor devices with or without protection against simple side-channel attacks.

The previous method to replace multiplications is applied to different settings as illustrated by FIGS. 2 and 3, and to every ECC point operation on a given elliptic curve. Specifically, FIG. 2 presents a methodology for the case where protection against SSCA needs to be implemented. The procedure is described in the following.

According to the particular application, at step 210 it is determined if SSCA protection is required. If at decision block 220 it is determined that protection is not to be implemented, then at step 230 the procedure depicted by FIG. 3 is executed to determine the architecture to be used.

If at decision block 220 it is determined that protection is to be implemented, then at block 240 the number of field multiplications and squarings found in an ECC point operation are counted.

At step 250, a balanced number of field multiplications and squarings should be determined in such a way that the minimum number of atomic blocks is required for the given ECC point operation. Such decisions should take into consideration the atomic structure to be used at step 260. For instance, the following new atomic structures: S-N-A-M-N-A-A (squaring-negation-addition-multiplication-negation-addition-addition) or S-N-A-A-M-N-A-A (squaring-negation-addition-addition-multiplication-negation-addition-addition) may be utilized. Note that squaring has been included into the atomic structure, which not only speeds up computations since squaring is usually faster than multiplication, but also protects against potential attacks that are able of distinguishing multiplication from squaring. At this step, the method detailed in FIG. 1 can be used to achieve the balanced number of multiplications and squarings. Thus, multiplications are traded by 1, 2 or 3 squarings according to the given ECC point operation.

For instance, for the point addition in generic elliptic curves traditionally containing 8 multiplications and 3 squarings:

$$X_3 = \alpha^2 - \beta^3 - 2X_1\beta^2$$

$$Y_3 = \alpha(X_1\beta^2 - X_3) - Y_1\beta^3$$

$$Z_3 = Z_1\beta$$

Where: $\alpha = Z_1^3 Y_2 - Y_1$, $\beta = Z_1^2 X_2 - X_1$

A balanced number of multiplications and squarings can be fixed at 6 and 6, respectively, by using the method in FIG. 1, which yields the following:

$$X_3 = \alpha^2 - 4\beta^3 - 2\theta$$

$$Y_3 = \alpha(\theta - X_3) - 8Y_1\beta^3$$

$$Z_3 = (Z_1+\beta)^2 - Z_1^2 - \beta^2$$

Where: $\alpha = Z_1^3 Y_2 - Y_1$, $\beta = Z_1^2 X_2 - X_1$, $\theta = (X_1+\beta^2)^2 - (X_1-\beta^2)^2$ In the previous example, the new point representation $(4X_3, 8Y_3, 2Z_3)$, equivalent to $(X_3, Y_3, Z_3)$, uses multiples of 2 and makes possible substitutions (3) and (4) for $Z_3$ and $\theta$, respectively.

Balancing and fixing the computing cost to 6 multiplications and 6 squarings makes the point addition require only 6 S-N-A-M-N-A-A atomic blocks in contrast to the original 11 M-A-N-A atomic blocks, which represents a significant reduction in execution time.

Final block 270 proceeds to the execution of the procedure in FIG. 3 to determine the architecture to be used.

FIG. 3 presents a methodology for speeding up ECC point operations according to whether a parallel/multiprocessor or sequential architecture is used. The procedure is described in the following.

According to the particular application, at step 310 it is determined if a sequential-style or a parallel/multiprocessor architecture will be used for the implementation.

If at decision block 320 the sequential architecture is chosen, then the methodology depicted by FIG. 1 is executed at step 330 to replace expensive multiplications by squarings. Note that step 330 is executed if and only if the method in FIG. 1 has not been used yet as in the case where the implementation does not use SSCA protection.

Figure 4:
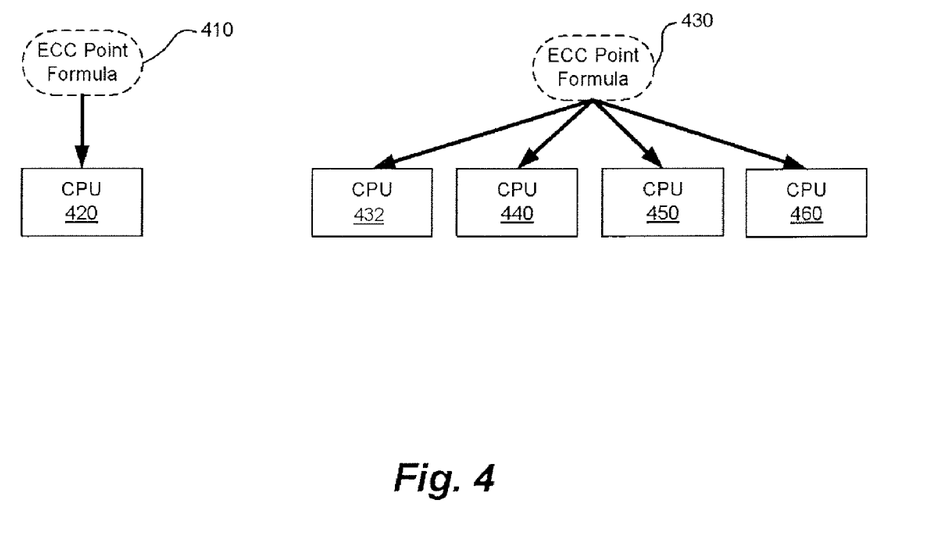
FIG. 4 is a block diagram of a multiprocessor implementation.

Final block 340 arranges field operations consecutively for each ECC point operation for their execution. If SSCA is implemented the execution follows the chosen atomic structure. As shown in FIG. 4, the ECC point operation 410 will be executed on a single processor 420.

If at decision block 320 the parallel architecture is chosen, then block 350 decides whether SSCA protection is being included as per FIG. 2.

If SSCA protection is not being included, at step 360 a new coordinate system given by $(X, Y, Z, X^2, Z^2, Z^3/Z^4)$ is provided. This minimizes the number of field operations required in parallel architectures by passing repetitive values between ECC point operations.

At step 370, the method as per FIG. 1 is applied to minimize the cost of each ECC point operation using the new coordinate system. In this case, replacing multiplications by 1, 2 or 3 squarings allows the minimization or elimination of multiplications and maximizes the use of available processors. For instance, for the case of point addition discussed in the previous examples, the method of replacing multiplications by squarings modifies such operations to obtain:

$$X_3 = 4\alpha^2 - 4\beta^3 - 8X_1\beta^2$$

$$Y_3 = 2\alpha(4X_1\beta^2 - X_3) - 8Y_1\beta^3$$

$$Z_3 = (Z_1+\beta)^2 - Z_1^2 - \beta^2$$

Where: $\alpha = Z_1^3 Y_2 - Y_1$, $\beta = Z_1^2 X_2 - X_1$, $2Y_1\beta$ is computed as $(Y_1+\beta)^2 - Y_1^2 - \beta^2$, and $2\alpha(4X_1\beta^2 - X_3)$ as $(\alpha + 4X_1\beta^2 - X_3)^2 - \alpha^2 - (4X_1\beta^2 - X_3)^2$.

Although the previous example apparently derived a more expensive operation with a higher number of squarings, when performing final block 380 to distribute the field operations among the different processing units, the processor utilization can be maximized and the effective number of parallel multiplications minimized, as shown in the next table for the parallel point addition. Also, note that the number of processing units has been effectively increased to 4.

| Parallel Operation | Addition: $(X_1, Y_1, Z_1, Z_1^2, Z_1^3) + (X_2, Y_2) = (X_3, Y_3, Z_3, X_3^2, Z_3^2, Z_3^4)$ | | | |
| --- | --- | --- | --- | --- |
|  | Processor1 | Processor2 | Processor3 | Processor4 |
| 1. Multiplication | $Z_1^3 \cdot Y_2$ | $Z_1^2 \cdot X_2$ | $Y_1^2$ | * |
| 2. Squaring | $\alpha^2$ | $(Z_1+\beta)^2$ | $(Y_1+\beta)^2$ | $\beta^2$ |
| 3. Multiplication | $2\beta \cdot 2\beta^2$ | $Z_3^2$ | $2Y_1\beta \cdot 4\beta^2$ | $2X_1 \cdot 2\beta^2 = 4X_1\beta^2$ |
| 4. Squaring | $X_3^2$ | $Z_3^4$ | $(4X_1\beta^2 - X_3)^2$ | $(\alpha + 4X_1\beta^2 - X_3)^2$ |

A shown in FIG. 4, in the parallel/multiprocessor implementation ECC point formula 430 can be distributed across multiple processors, 432, 440, 450 and 460 by utilizing the new coordinate system and modifying the ECC point formula accordingly.

Figure 5:
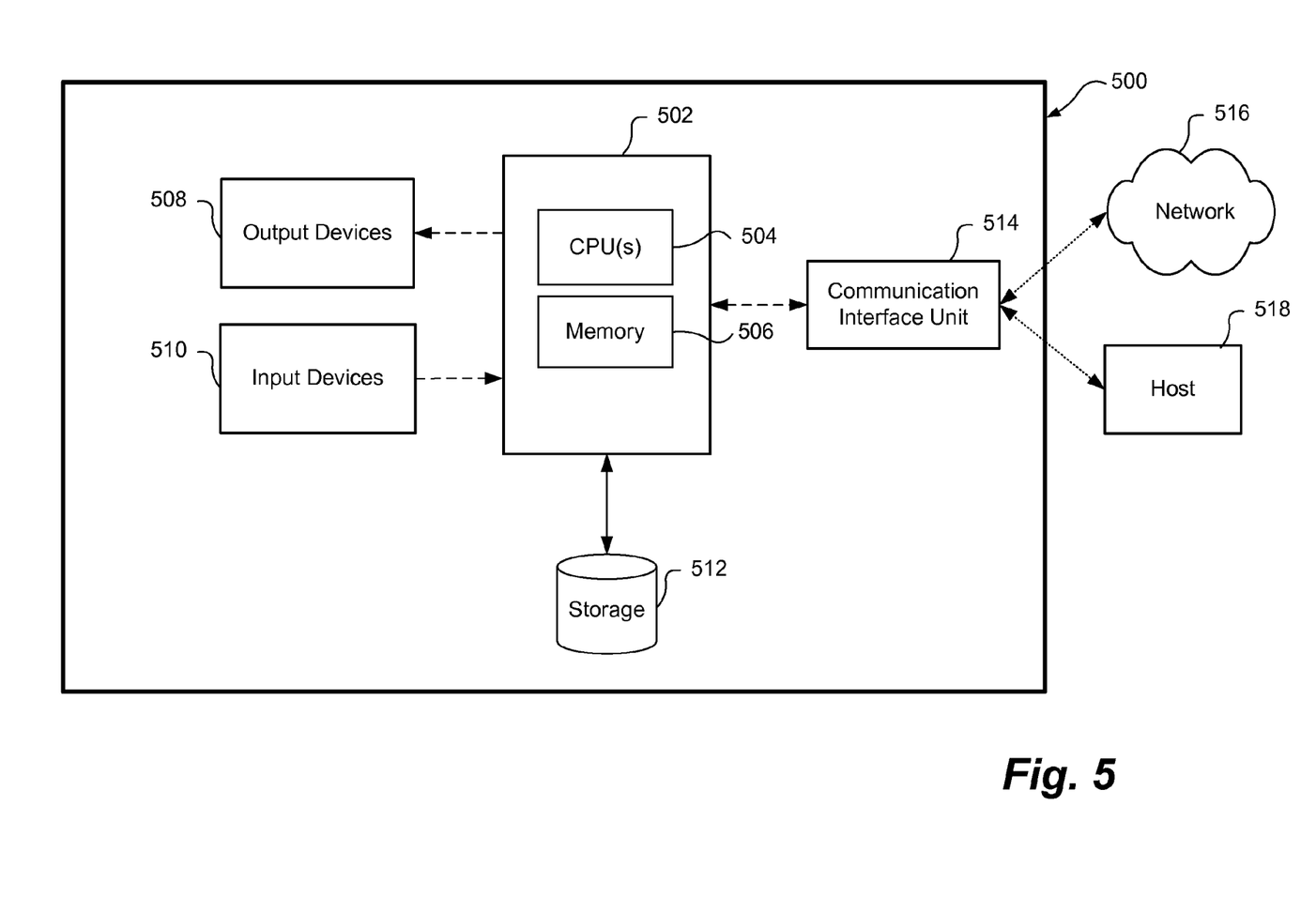
FIG. 5 is a block diagram illustrating an execution environment.

Referring to FIG. 5, it provides a computing environment 500 in which an elliptic curve cryptosystem may be implemented as computer software in the form of computer readable code executed. The computing environment may be any number of computing or computer based platforms such as mobile devices, personal computer, notebook computers, personal digital assistants, networking devices such as routers, or be resident in application specific processors devices such as smart cards, security cards or radio frequency identification (RFID) devices requiring security implementations.

The computer 502 comprises central processing unit (CPU) 504 and memory 506. The CPU may be a single processor or multiprocessor system. In addition a multiprocessor implementation of the elliptic curve cryptosystem may utilize more than one computing environment for execution of a parallel architecture. In various computing environments, main memory 506 and storage 512 can reside wholly on computer environment 500, or they may be distributed between multiple computers.

Input devices 510 such as a keyboard and mouse may be coupled to a bi-directional system bus of a computer 502. The keyboard and mouse are for introducing user input to a computer 502 and communicating that user input to processor 504 if required. Computer 502 may also include a communication interface 514. Communication interface 514 provides a two-way data communication coupling via a network link to a network 516 by wired or wireless connection or may provide an interface to other host device 518 by a direct radio frequency connection. In any such implementation, communication interface 514 sends and receives electrical, electromagnetic or optical signals which carry digital data streams representing various types of information.

Communication between the communication interface unit 514 and the network 516 or host 518 use electrical, electromagnetic or optical signals which carry digital data streams. The signals through the various networks and the signals on network link and through communication interface, which carry the digital data to and from computer, are exemplary forms of carrier waves transporting the information. The computer 502 may also be able to display the results of the computation to a user in the form of output devices 508.

The computer processor 504 or similar device may be programmed in the manner of method steps, or may be executed by an electronic system which is provided with means for executing these steps. The storage device 512 may include both fixed and removable media, such as magnetic, optical or magnetic optical storage systems, Random Access Memory (RAM), Read Only Memory (ROM) or any other available mass storage technology. The storage device or media may be programmed to execute such method steps. As well, electronic signals representing these method steps may also be transmitted via a communication network.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment. It will be apparent to persons skilled in the art that a number of variations and modifications can be made without departing from the scope of the invention as defined in the claims.

The method steps of the invention may be embodied in sets of executable machine code stored in a variety of formats such as object code or source code. Such code is described generically herein as programming code, or a computer program for simplification. Clearly, the executable machine code or portions of the code may be integrated with the code of other programs, implemented as subroutines, plug-ins, add-ons, software agents, by external program calls, in firmware or by other techniques as known in the art.

The embodiments of the invention described above are intended to be illustrative only. The scope of the invention is therefore intended to be limited solely by the scope of the appended claims.

The invention claimed is:

1. A method of accelerating scalar multiplication in an elliptic curve cryptosystem (ECC) over prime fields, the method comprising the steps of:
   a) identifying multiplication operations within an ECC point operation that can be replaced by one field squaring and other cheaper field operations when applying algebraic substitutions;
   b) determining if field multiplication operations in step a) are even or odd field multiplications;
   c) modifying the ECC point operation with an equivalent point representation utilizing multiples of two if step b) identified odd field multiplications or keeping the ECC point operation unchanged if there is an efficient division by two available; and
   d) performing algebraic substitutions of the field multiplication operations from step a) with field operations comprising the one field squaring operations and other cheaper field operations selected from addition, subtraction and multiplication or division by a small constant, wherein steps a)-d) are executed by a processor.

2. The method of claim 1 where scalar multiplication is defined by:

$$Q = dP$$

where P and Q are points in $E(F_p)$ of order q, and d is a secret scalar.

3. The method of claim 2 wherein at step c) the ECC point operation is modified using the equivalence class for projective coordinates:

$$(X:Y:Z) = \{(\lambda^c X, \lambda^d Y, \lambda Z) : \lambda \in K^*, c, d \in Z^+\},$$

where $\lambda = 2t$, $t \in Z^+$, to insert multiples of 2.

4. The method of claim 3 wherein the algebraic substitutions are of the form $2ab = (a+b)^2 - a^2 - b^2$ or $4ab = (a+b)^2 - (a-b)^2$ to replace field multiplications by field squarings and other cheaper field operations or of the form $ab = 1/2[(a+b)^2 - a^2 - b^2]$ if there is an efficient division by two available.

5. The method of claim 1 further comprising the step of:
   determining the number of field multiplication operations and field squaring operations in the ECC point operation prior to step a);
   wherein step a) further comprises:
   identifying field multiplication operations within an ECC operation to be replaced by one, two or three field squarings using algebraic substitution such that the number of field multiplication operations and field squaring operations is balanced;
   wherein step d) further comprises:
   performing algebraic substitutions of the multiplication operations from step a) with field operations comprising one or more field squaring operations and other cheaper field operations to obtain the balanced number of field multiplications and field squarings.

6. The method of claim 5 further comprising the step of:
   e) defining an atomic structure for execution of the ECC point operation wherein the atomic structure is defined to be resistant to simple side channel attacks (SSCA) by levelling power dissipation, electromagnetic emission or any other information leakage by the processor.

7. The method of claim 6 wherein the atomic structures to protect against SSCA are defined by performing the field operations of Squaring-Negation-Addition-Multiplication-Negation-Addition-Addition (S-N-A-M-N-A-A) or Squaring-Negation-Addition-Addition-Multiplication-Negation-Addition-Addition (S-N-A-A-M-N-A-A).

8. The method of claim 1, wherein the processor comprises a plurality of processors, and wherein prior to step a), the method further comprises the step of: defining a new coordinate system defined by $(X, Y, Z, X^2, Z^2, Z^3/Z^4)$; and wherein the field operations are distributed to each one processor of the plurality of processors in respect of the defined coordinate system.

9. The method of claim 4 wherein the ECC point operations are on an elliptic curve defined by:

$$E: y^2 = x^3 + ax + b$$

where: $a, b \in F_p$ and $\Delta = 4a^3 + 27b^2 \neq 0$.

10. The method of claim 1 wherein the ECC point operations are on a Hessian or Jacobi form.

11. The method of claim 1 wherein the ECC point operations are based upon elliptic curves with degree ⅔ isogenies.

12. An apparatus for performing scalar multiplications on an elliptic curve cryptosystem, the apparatus comprising: a memory; a processor for performing the steps of:
   a) identifying field multiplication operations within an ECC point operation that can be replaced by one field squaring and other cheaper field operations when applying algebraic substitutions;
   b) determining if field multiplication operations in step a) are even or odd field multiplications;
   c) modifying the ECC point operation with an equivalent point representation utilizing multiples of two if step b) identified odd field multiplications or keeping the ECC point operation unchanged if there is an efficient division by two available; and
   d) performing algebraic substitutions of the field multiplication operations from step a) with field operations comprising the one field squaring operations and other cheaper field operations selected from addition, subtraction and multiplication or division by a small constant.

13. The apparatus of claim 12 where the scalar multiplications are defined by:
   Q=dP where P and Q are points in E(F.sub.p) of order q, and d is a secret scalar.

14. The apparatus of claim 13 wherein at step c) the ECC point operation is modified using the equivalence class for projective coordinates:

$$(X:Y:Z) = \{(\lambda^c, X, \lambda^d, Y, \lambda Z) : \lambda \in K^*, c, d \in Z^+\},$$

where $\lambda = 2t$, $t \in Z^+$, to insert multiples of 2.

15. The apparatus of claim 14 wherein the algebraic substitution is of the form $2ab = (a+b)^2 - a^2 - b^2$ or $4ab = (a+b)^2 - (a-b)^2$ to replace field multiplications by field squaring and other cheaper field operations or of the form $ab = 1/2[(a+b)^2 - a^2 - b^2]$ if there is an efficient division by two available.

16. The apparatus of claim 12 wherein the processor further performs the steps of:
   determining the number of field multiplication operations and squaring operations in the ECC point operation prior to step a);

wherein step a) further comprises:
   identifying field multiplication operations within an ECC operation to be replaced by one, two or three field squarings using algebraic substitutions such that the number of field multiplication operations and field squaring operations are balanced;
wherein step d) further comprises:
   performing algebraic substitutions of the multiplication operations with field squaring operations and other cheaper field operations to obtain the balanced number of field multiplications and field squarings.

17. The apparatus of claim 16 wherein the processor further performs the step of:
   e) defining an atomic structure for execution of the ECC point operation wherein the atomic structure is defined to be resistant to simple side channel attacks (SSCA) by levelling power dissipation, electromagnetic emission or any other information leakage by processor.

18. The apparatus of claim 17 wherein the atomic structures to protect against SSCA are defined by performing the field operations of Squaring-Negation-Addition-Multiplication-Negation-Addition-Addition (S-N-A-M-N-A-A) or Squaring-Negation-Addition-Addition-Multiplication-Negation-Addition-Addition (S-N-A-A-M-N-A-A).

19. The apparatus of claim 12 wherein the processor comprises a plurality of processors, and wherein prior to step a), the processor performs the step of: defining a new coordinate system defined by $(X, Y, Z, X^2, Z^2, Z^3/Z^4)$; and wherein the field operations are distributed to each one processor of the plurality of processors in respect of the defined coordinate system.

20. The apparatus of claim 12 wherein the ECC point operation is on an elliptic curve defined by:

$$E: y^2 = x^3 + ax + b$$

where: $a, b \in F_p$ and $\Delta = 4a^3 + 27b^2 \neq 0$.

21. The apparatus of claim 12 wherein the ECC point operations are on a Hessian or Jacobi form.

22. The apparatus of claim 12 wherein the ECC point operations are based upon elliptic curves with degree ⅔ isogenies.

23. The apparatus of claim 12 wherein the apparatus is a mobile device.

24. The apparatus of claim 12 wherein the system is implemented in a smart card.

25. A computer readable memory containing instructions for accelerating scalar multiplication in an elliptic curve cryptosystem (ECC) over prime fields, the instructions which when executed by a processor perform the steps of:
   a) identifying field multiplication operations within an ECC point operation that can be replaced by one field squaring and other cheaper field operations when applying algebraic substitutions;
   b) determining if field multiplication operations in step a) are even or odd field multiplications;
   c) modifying the ECC point operation with an equivalent point representation utilizing multiples of two if step b) identified odd field multiplications or keeping the ECC point operation unchanged if there is an efficient division by two available; and
   d) performing algebraic substitutions of the field multiplication operations from step a) with field operations comprising the one field squaring operations and other cheaper field operations selected from addition, subtraction and multiplication or division by a small constant.

* * * * *